No. 767,609. PATENTED AUG. 16, 1904.
R. TEEGLER.
ENGINE LATHE.
APPLICATION FILED JULY 16, 1903.
NO MODEL.
Fig.1.
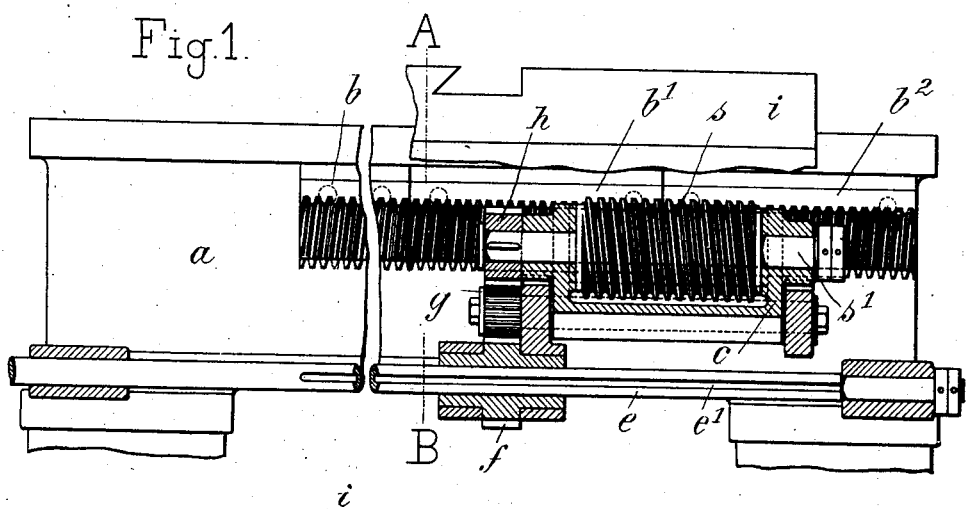
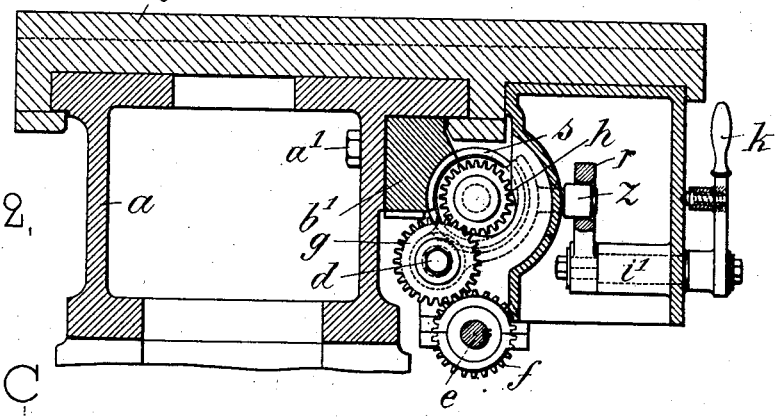
Fig.2.
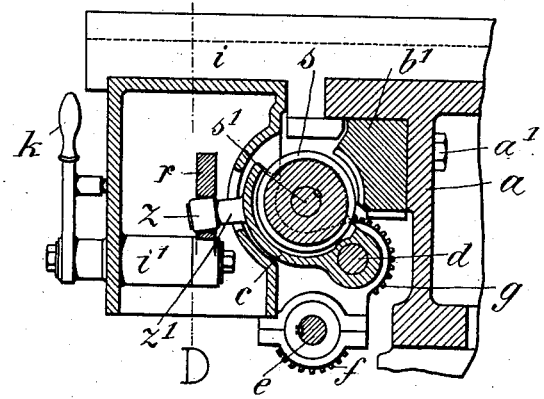
Fig.3.
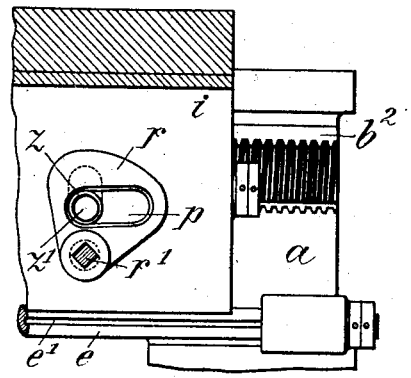
Fig.4.
Witnesses:
Arthur Gumper
Fred. Unfricht
Inventor
Robert Teegler
by Frank Rot Rieser Atty.

No. 767,609. Patented August 16, 1904.

UNITED STATES PATENT OFFICE.

ROBERT TEEGLER, OF HEERDT, NEAR DÜSSELDORF, GERMANY.

ENGINE-LATHE.

SPECIFICATION forming part of Letters Patent No. 767,609, dated August 16, 1904.

Application filed July 16, 1903. Serial No. 165,792. (No model.)

*To all whom it may concern:*

Be it known that I, ROBERT TEEGLER, a citizen of Germany, residing at Heerdt, near Düsseldorf, Germany, have invented a new and Improved Lathe, of which the following is a specification.

This invention relates to an improved lathe the frame of which is provided with a mutilated nut that is engaged by a rotatable screw carried by the slide-rest.

The lead-screws generally in use on lathes wear out unequally, as the portion near the head-stock is used more frequently than the other parts. This unequal wearing out of the screw effects an irregular feed of the slide-rest and the work-tool. In order to overcome this objection, I provide the frame of the lathe with a mutilated nut that is engaged by a screw carried by the slide-rest in such a manner that it may be brought out of engagement with the nut during the backward movement of the slide-rest. The nut is composed, preferably, of a suitable number of separate sections, so that the worn-out sections may easily be removed and replaced.

In the accompanying drawings, Figure 1 is a side view, partly broken away, of part of a lathe embodying my invention. Fig. 2 is a cross-section thereof. Fig. 3 is a similar cross-section showing the parts in a different position, and Fig. 4 is a vertical section on line C D, Fig. 3.

To the frame $a$ of the lathe is attached by screws $a'$ a mutilated nut that is preferably composed of a suitable number of separate sections $b\ b'\ b^2$, as shown in Fig. 1. The nut $b$ is engaged by a screw or worm $s$, fast on shaft $s'$, that rotates in bearings of a pivoted frame $c$. This frame is adapted to swing on a pin $d$, carried by the slide-rest $i$. Upon shaft $s'$ there is mounted a fast pinion $h$, that intergears with a pinion $g$, loosely mounted upon pin $d$. Pinion $g$ in turn is engaged by a gear-wheel $f$, movable along a spindle $e$. Spindle $e$ extends along the frame of the lathe and receives rotary motion in the usual manner. A longitudinal groove $e'$ of spindle $e$ is engaged by a feather of gear-wheel $f$, so that the rotation of shaft $e$ will impart a corresponding rotation to screw $s$ through gear-wheels $f$, $g$, and $h$. The swinging frame $c$ is provided with a stud $z'$, carrying roller $z$. This roller engages an inclined slot $p$ of an arm $r$, which is rigidly secured to a shaft $r'$. The latter is mounted in a suitable bearing $i'$ of slide-rest $i$ and is provided with a handle $k$. By turning handle $k$ the arm $r$ will be turned on fulcrum $r'$ and will by the engagement of slot $p$ with roller $z$ tilt the swinging frame $c$ around pin $d$, so as to bring screw $s$ into or out of engagement with the sections $b\ b'\ b^2$ of the mutilated nut. Thus it will be seen that after the tool carried by slide-rest $i$ has performed its work the screw $s$ may be brought out of engagement with nut $b$ by turning handle $k$. After this disengagement has been effected the slide-rest may be brought back into its initial position by hand without the use of nut $b$. In this way the wearing out of nut $b$ is limited to a minimum. Further, as the nut is composed of several sections the worn-out pieces may easily be removed or replaced.

What I claim is—

A lathe provided with a mutilated nut, a slide-rest, a frame pivoted to the slide-rest, a screw rotatably supported by the frame and adapted to engage the nut, a stud on the frame, an arm having an inclined slot which is engaged by the stud, a hand-lever connected to the arm, and means for locking the hand-lever, substantially as specified.

Signed by me at Düsseldorf, Germany, this 29th day of June, 1903.

ROBERT TEEGLER.

Witnesses:
WILLIAM ESSENWEIN,
PETER LIEBER.